(12) United States Patent
Takeda

(10) Patent No.: US 10,556,343 B2
(45) Date of Patent: Feb. 11, 2020

(54) SIMULATION DEVICE AND SIMULATION METHOD FOR ROBOT SYSTEM

(71) Applicant: FANUC CORPORATION, Yamanashi (JP)

(72) Inventor: Toshiya Takeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 25 days.

(21) Appl. No.: 16/050,405

(22) Filed: Jul. 31, 2018

(65) Prior Publication Data

US 2019/0039243 A1 Feb. 7, 2019

(30) Foreign Application Priority Data

Aug. 3, 2017 (JP) .................................. 2017-150615

(51) Int. Cl.
 *B25J 9/16* (2006.01)
(52) U.S. Cl.
 CPC .............. *B25J 9/1671* (2013.01); *B25J 9/161* (2013.01); *B25J 9/1605* (2013.01)
(58) Field of Classification Search
 USPC ................................................. 700/245–264
 See application file for complete search history.

(56) References Cited

U.S. PATENT DOCUMENTS 4,360,886 A * 11/1982 Kostas ...................... B25J 3/04
 318/568.14
5,825,981 A * 10/1998 Matsuda .......... G05B 19/41815
 700/248

(Continued)

FOREIGN PATENT DOCUMENTS

EP 1881383 A2 1/2008
JP H03250304 A 11/1991

(Continued)

OTHER PUBLICATIONS

Japanese Decision to Grant a Patent dated May 28, 2019, for Japanese Patent Application No. 2017-150615.

(Continued)

*Primary Examiner* — Jonathan L Sample
(74) *Attorney, Agent, or Firm* — Karceski IP Law, PLLC

(57) ABSTRACT

A simulation device for a robot system includes: an input unit that allows input of the constitution of a virtual robot; a storage unit that stores the constitutions and elements of virtual-robot candidates and settings of virtual-robot-controller candidates in association with each other; a difference extracting unit that reads the constitution of one of the virtual-robot candidates that most closely approximates the input virtual robot and extracts the difference; a virtual-robot generating unit that reads the setting of the associated virtual-robot-controller candidate and the settings of the virtual-robot-controller candidates associated with the elements of the virtual-robot candidates included in the extracted difference and that adds or deletes the setting for each of the elements to generate new candidates and a new virtual robot and virtual robot controller; and a candidate updating unit that stores the constitutions of the new virtual-robot candidates and the settings of the generated virtual-robot-controller candidates.

10 Claims, 5 Drawing Sheets

(56) References Cited

U.S. PATENT DOCUMENTS

| | | | | |
|---|---|---|---|---|
| 2003/0060930 A1* | 3/2003 | Fujita | ............... | B25J 9/1602 |
| | | | | 700/245 |
| 2003/0191560 A1* | 10/2003 | Yokoo | ............... | A63H 11/00 |
| | | | | 700/245 |
| 2004/0143369 A1* | 7/2004 | Takenaka | ............... | B62D 57/032 |
| | | | | 700/245 |
| 2007/0203685 A1* | 8/2007 | Takano | ............... | H04L 67/12 |
| | | | | 703/23 |
| 2008/0013825 A1* | 1/2008 | Nagatsuka | ............... | B25J 9/1671 |
| | | | | 382/153 |
| 2009/0326713 A1* | 12/2009 | Moriya | ............... | A63H 17/00 |
| | | | | 700/255 |
| 2010/0292840 A1* | 11/2010 | Ruan | ............... | B25J 5/007 |
| | | | | 700/259 |
| 2011/0306986 A1* | 12/2011 | Lee | ............... | B25J 9/1689 |
| | | | | 606/130 |
| 2012/0136481 A1* | 5/2012 | Maisonnier | ............... | B25J 9/1661 |
| | | | | 700/257 |
| 2014/0038751 A1* | 2/2014 | Yeager | ............... | A63B 47/002 |
| | | | | 473/431 |
| 2015/0130794 A1* | 5/2015 | Katsuda | ............... | G06T 15/20 |
| | | | | 345/419 |
| 2015/0227653 A1* | 8/2015 | Sasaki | ............... | G06F 17/5009 |
| | | | | 703/2 |
| 2016/0199981 A1* | 7/2016 | Atohira | ............... | B25J 9/1671 |
| | | | | 700/248 |
| 2016/0332297 A1* | 11/2016 | Sugaya | ............... | B25J 9/161 |
| 2017/0140259 A1* | 5/2017 | Bergstra | ............... | B25J 9/161 |

FOREIGN PATENT DOCUMENTS

| | | |
|---|---|---|
| JP | H09054608 A | 2/1997 |
| JP | H11058277 A | 3/1999 |
| JP | H11207671 | 8/1999 |
| JP | 2001100834 A | 4/2001 |
| JP | 2004326732 | 11/2004 |
| JP | 2005250793 A | 9/2005 |
| JP | 2008021092 | 1/2008 |
| JP | 2008090488 A | 4/2008 |
| JP | 2011156605 A | 8/2011 |
| JP | 2015148994 A | 8/2015 |
| JP | 2016129915 | 7/2016 |
| WO | 2008078890 A1 | 7/2008 |

OTHER PUBLICATIONS

Search Report from Registered Searching Authority provided with Japanese Decision to Grant a Patent dated May 28, 2019, for Japanese Patent Application No. 2017-150615.

* cited by examiner

FIG. 2

STORAGE UNIT

| CONSTITUTION AND ELEMENT OF VIRTUAL-ROBOT CANDIDATE | SETTING OF VIRTUAL-ROBOT-CONTROLLER CANDIDATE | REQUIRED ADDING TIME | REQUIRED DELETING TIME | |
|---|---|---|---|---|
| ABCD | X1 | | | |
| ACDE | X2 | | | |
| AEF | X3 | | | |
| A | X4 | t11 | t12 | |
| B | X5 | t21 | t22 | |
| C | X6 | t31 | t32 | |
| D | X7 | t41 | t42 | |
| E | X8 | t51 | t52 | |
| F | X9 | t61 | t62 | |
| ... | ... | ... | ... | |
| | | | | |

SIMULATION DEVICE AND SIMULATION METHOD FOR ROBOT SYSTEM

CROSS-REFERENCE TO RELATED APPLICATIONS

This application is based on and claims priority to Japanese Patent Application No. 2017-150615, filed on Aug. 3, 2018, the entire contents of which are incorporated herein by reference.

FIELD OF THE INVENTION

The present invention relates to simulation devices and simulation methods for robot systems.

BACKGROUND OF THE INVENTION

There are known simulation devices for robot systems, in which simulation is performed with a three-dimensional model of a robot placed in a virtual space (e.g., see Japanese Unexamined Patent Application, Publication No. 2016-129915).

SUMMARY OF THE INVENTION

An aspect of the present invention is to provide a simulation device and simulation method for a robot system that make it possible to reduce the time needed for generating a virtual robot controller to be simulated.

The present invention, in one aspect thereof, provides a simulation device for a robot system, the simulation device including an input unit that allows input of the constitution of a virtual robot to be simulated; a storage unit that stores the constitutions as well as elements of virtual-robot candidates and settings of virtual-robot-controller candidates in association with each other; a difference extracting unit that reads, from the storage unit, the constitution of one of the virtual-robot candidates that most closely approximates the constitution of the virtual robot input via the input unit and that extracts the difference between the read constitution of the virtual-robot candidate and the constitution of the virtual robot input via the input unit; a virtual-robot generating unit that reads, from the storage unit, the setting of the virtual-robot-controller candidate associated with the constitution of the most approximate virtual-robot candidate and the settings of the virtual-robot-controller candidates associated with the elements of the virtual-robot candidates included in the difference extracted by the difference extracting unit and that adds or deletes the setting of the associated virtual-robot-controller candidate for each of the elements of the virtual-robot candidates included in the difference to or from the setting of the most approximate virtual-robot-controller candidate to generate the constitutions of new virtual-robot candidates and settings of virtual-robot-controller candidates associated therewith and the constitution of a new virtual robot and a setting of a virtual robot controller associated therewith; and a candidate updating unit that stores, in the storage unit, the constitutions of the new virtual-robot candidates and the settings of the virtual-robot-controller candidates associated therewith, generated by the virtual-robot generating unit.

In the above aspect, the storage unit may store, for each of the elements of the virtual-robot candidates, a required time for adding or deleting a setting associated with that element, and the difference extracting unit may read, from the storage unit, as the most approximate virtual-robot candidate, a virtual-robot candidate with the least total required time for obtaining the setting of the virtual robot controller associated with the constitution of the virtual robot input via the input unit.

In the above aspect, the difference extracting unit, for each of the elements of the virtual-robot candidates stored in the storage unit, may add the required time for adding the element, stored in the storage unit in association with the element, in the case where the element is included in the virtual robot input via the input unit, may subtract the required time for deleting the element, stored in the storage unit in association with the element, in the case where the element is not included in the virtual robot input via the input unit, and may read the virtual robot candidate with the greatest value of the computation result as the most approximate virtual robot candidate.

In the above aspect, the difference extracting unit may add up the required times stored in the storage unit in association with the individual elements included in the difference when adding or deleting the settings associated with those elements and may use the virtual robot candidate with the least value of the computation result as the most approximate virtual robot candidate.

In the above aspect, the simulation device may further include a usage-frequency counting unit that increments the usage frequency of a virtual-robot candidate each time the virtual-robot candidate is read by the difference extracting unit as the most approximate virtual-robot candidate; and a storage-capacity detecting unit that detects the remaining capacity of the storage unit, the candidate updating unit may delete, from the storage unit, the constitution of a virtual robot candidate that approximates a virtual-robot candidate with the greatest usage frequency, as well as the setting of the virtual-robot-controller candidate associated therewith, in the case where the remaining capacity detected by the storage-capacity detecting unit is less than a predetermined threshold.

In the above aspect, each time the virtual-robot generating unit generates the constitution of a new virtual-robot candidate and a setting of a virtual-robot-controller candidate associated therewith, the candidate updating unit may store the constitution and the setting in the storage unit.

In the above aspect, each time the virtual-robot generating unit generates settings of virtual-robot-controller candidates associated with the constitutions of a predetermined number of new virtual-robot candidates, the candidate updating unit may store the constitutions and the settings in the storage unit.

In the above aspect, the candidate updating unit may change the predetermined number in accordance with a required speed of storage into the storage unit or the amount of information to be stored in the storage unit.

The present invention, in another aspect thereof, provides a simulation method for a robot system, the simulation method including an input step of allowing input of the constitution of a virtual robot to be simulated; a difference extracting step of reading, from a storage unit, the constitution of one of the virtual-robot candidates that most closely approximates the constitution of the virtual robot input in the input step and extracting the difference between the read constitution of the virtual-robot candidate and the constitution of the virtual robot input in the input step; a virtual-robot generating step of reading, from the storage unit, the setting of the virtual-robot-controller candidate associated with the constitution of the most approximate virtual-robot candidate and the settings of the virtual-robot-controller candidates associated with elements of the virtual-robot candidates included in the difference extracted in the difference extracting step and adding or deleting the setting of the associated virtual-robot-controller candidate for each of the elements of the virtual-robot candidates included in the difference to or from the setting of the most approximate virtual-robot-controller candidate to generate the constitutions of new virtual-robot candidates and settings of virtual-robot-controller candidates associated therewith and the constitution of a new virtual robot and a setting of a virtual robot controller associated therewith; and a candidate updating step of storing, in the storage unit, the constitutions of the new virtual-robot candidates and the settings of the virtual-robot-controller candidates associated therewith, generated in the virtual-robot generating step.

In the above aspect, the storage unit may store, for each of the elements of the virtual-robot candidates, a required time for adding or deleting a setting associated with that element, and in the difference extracting step, as the most approximate virtual-robot candidate, a virtual-robot candidate with the least total required time for obtaining the setting of the virtual robot controller associated with the constitution of the virtual robot input in the input step may be read from the storage unit.

BRIEF DESCRIPTION OF THE DRAWINGS

FIG. 2 is a diagram showing an example of information stored in a storage unit included in the simulation device in FIG. 1.

DESCRIPTION OF EMBODIMENTS OF THE INVENTION

A simulation device 1 for a robot system according to an embodiment of the present invention will be described below with reference to the drawings.

The robot system includes a robot of an arbitrary form and a robot controller that controls the robot.

The simulation device 1 for a robot system according to this embodiment is a device that places a virtual robot constituted of a three-dimensional model simulating a robot to be simulated in a virtual space realized by using a computer, that generates a virtual-robot controller simulating a robot controller on the computer, and that controls the virtual robot by means of the virtual-robot controller to simulate the operation of the robot on a screen of the computer.

Figure 1:
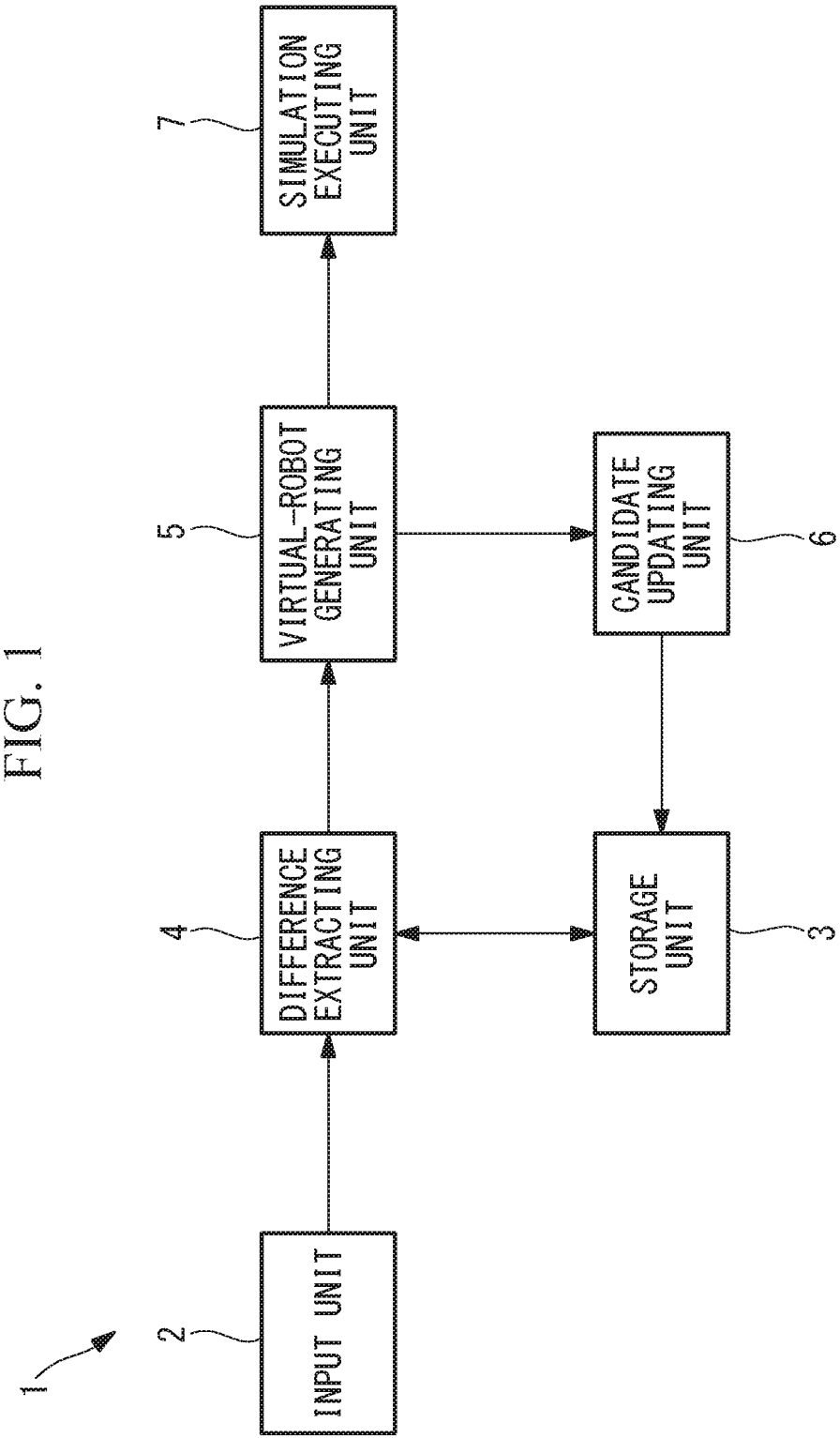
FIG. 1 is a block diagram showing a simulation device for a robot system according to an embodiment of the present invention.

As shown in FIG. 1, the simulation device 1 includes an input unit 2 that allows an operator to input the constitution of a virtual robot to be simulated (hereinafter also referred to as an input constitution), a storage unit 3 that stores the constitutions of virtual-robot candidates and the settings of virtual-robot-controller candidates in association with each other, a difference extracting unit 4 that reads the constitution of a virtual robot candidate (hereinafter also referred to as a basic constitution) that most closely approximates the input constitution from the storage unit 3 and that extracts the difference of the basic constitution from the input constitution, a virtual-robot generating unit 5 that adds or deletes elements included in the extracted difference to or from the basic constitution to generate a virtual robot and a virtual-robot controller, a candidate updating unit 6 that stores (caches) the generated virtual robot and virtual-robot controller in the storage unit 3 as a virtual-robot candidate and a virtual-robot-controller candidate, and a simulation executing unit 7 that executes simulation by using the generated virtual robot and virtual-robot controller.

As shown in FIG. 2, the storage unit 3 stores the constitutions and elements of virtual-robot candidates and the settings of virtual-robot-controller candidates in association with each other. As the constitutions and elements of the virtual-robot candidates, as well as the constitutions of virtual robots generated in the past, individual elements for generating virtual-robot candidates are also stored.

In the example shown in FIG. 2, the constitutions ABCD, ACDE, and AEF of virtual-robot candidates generated in the past and individual elements A, B, C, D, . . . are stored individually in association with the settings X1, X2, . . . of virtual-robot-controller candidates therefor.

The constitution ABCD of a virtual-robot candidate is a combination of individual element A, B, C, and D. Examples of the individual elements include the product name of the robot, the product name of an additional device, such as a servo gun, the gear ratio, the acceleration, the operating range, and so forth.

Each of the settings X1, X2, . . . of virtual-robot-controller candidates includes one or more setting items.

The storage unit 3 stores, in association with the elements A, B, C, D, . . . of virtual-robot candidates, required times $t11, t21, t31, t41, \ldots$ for adding these elements A, B, C, D, . . . and required times $t12, t22, t32, t42, \ldots$ for deleting these elements A, B, C, D, . . . .

The difference extracting unit 4 is configured to read a plurality of basic constitutions from the storage unit 3 when an input constitution is input from the input unit 2, to individually extract the differences between the input constitution and the basic constitutions, and to calculate evaluation values representing required times for generating the input constitution by adding or deleting the individual differences to or from the individual basic constitutions. The required time for generating the input constitution includes the time needed for generating a three-dimensional model of a virtual robot by combining virtual-robot candidates stored in the storage unit 3 and the time needed for generating the setting of a virtual-robot controller associated with the virtual robot.

For example, in the case where the input constitution is ABDEF, the basic constitutions ABCD, ACDE, and AEF are read from the storage unit 3, and the individual differences thereof Y1:(−C+EF), Y2:(−C+BF), and Y3:(+BD) are extracted. Here, − (minus) indicates deleting an element, and +(plus) indicates adding an element.

The evaluation value for each of the virtual-robot candidates is calculated, for example, by adding up the required times for adding the elements of the virtual-robot candidate included in the input constitution and subtracting the required times for deleting the elements of the virtual-robot candidate not included in the input constitution. Then, the virtual-robot candidate having the highest evaluation value is read from the storage unit 3 as a virtual-robot candidate that most closely approximates the input constitution.

In the case of the above example, since the basic constitution ABCD includes elements A, B, and D included in the input constitution ABDEF and an element C not included in the input constitution ABDEF, an evaluation value Z1 is calculated as follows.

$$Z1=t11+t21+t41-t32$$

Since the basic constitution ACDE includes elements A, D, and E included in the input constitution ABDEF and an element C not included in the input constitution ABDEF, an evaluation value Z2 is calculated as follows.

$$Z2=t11+t41+t51-t32$$

Since the basic constitution AEF includes elements A, E, and F included in the input constitution ABDEF and does not include any element not included in the input constitution ABDEF, an evaluation value Z3 is calculated as follows.

$$Z3=t11+t51+t61$$

Then, the magnitudes of the evaluation values Z1, Z2, and Z3 are compared with each other, and the basic constitution having the highest evaluation value is read from the storage unit 3 as a virtual-robot candidate that most closely approximates the input constitution.

The virtual-robot generating unit 5 uses the virtual-robot candidate that most closely approximates the input constitution, read by the difference extracting unit 4 from the storage unit 3 as described above, as a basic constitution and sequentially adds or deletes the settings of the virtual-robot-controller candidates associated with the elements constituting the difference from the input constitution, thereby generating a virtual-robot controller that is suitable for the input constitution.

In this case, the virtual-robot generating unit 5 is configured to generate virtual-robot-controller candidates in which the individual elements included in the difference are added or deleted one by one in the process of generating a virtual-robot controller. The candidate updating unit 6 is configured to store each of the virtual-robot-controller candidates generated by the virtual-robot generating unit 5 in the storage unit 3 upon the generation thereof.

For example, in the case where the basic constitution ACDE is read from the storage unit 3 as a virtual-robot candidate that most closely approximates the input constitution in the above example, a constitution ABCDE in which the element B included in the difference Y2 from the input constitution is added, a constitution ABDE in which the element C included in the difference Y2 is deleted, and a constitution ABDEF in which the element F included in the difference Y2 is added are individually generated. Furthermore, in relation to the setting X2 for the virtual-robot-controller candidate associated with the basic constitution ACDE, the setting X5 associated with the element B is added, the setting X6 associated with the element C is deleted, and the setting X9 associated with the element F is added to individually generate virtual-robot-controller candidates. Then, these constitutions and virtual-robot-controller candidates are stored in the storage unit 3.

The candidate updating unit 6 is configured to store an individual element together with a required time for adding or deleting that element in the storage unit 3 in the case where the required time is not stored in the storage unit 3.

A simulation method using the thus-configured simulation device 1 for a robot system according to this embodiment will be described below.

Figure 3:
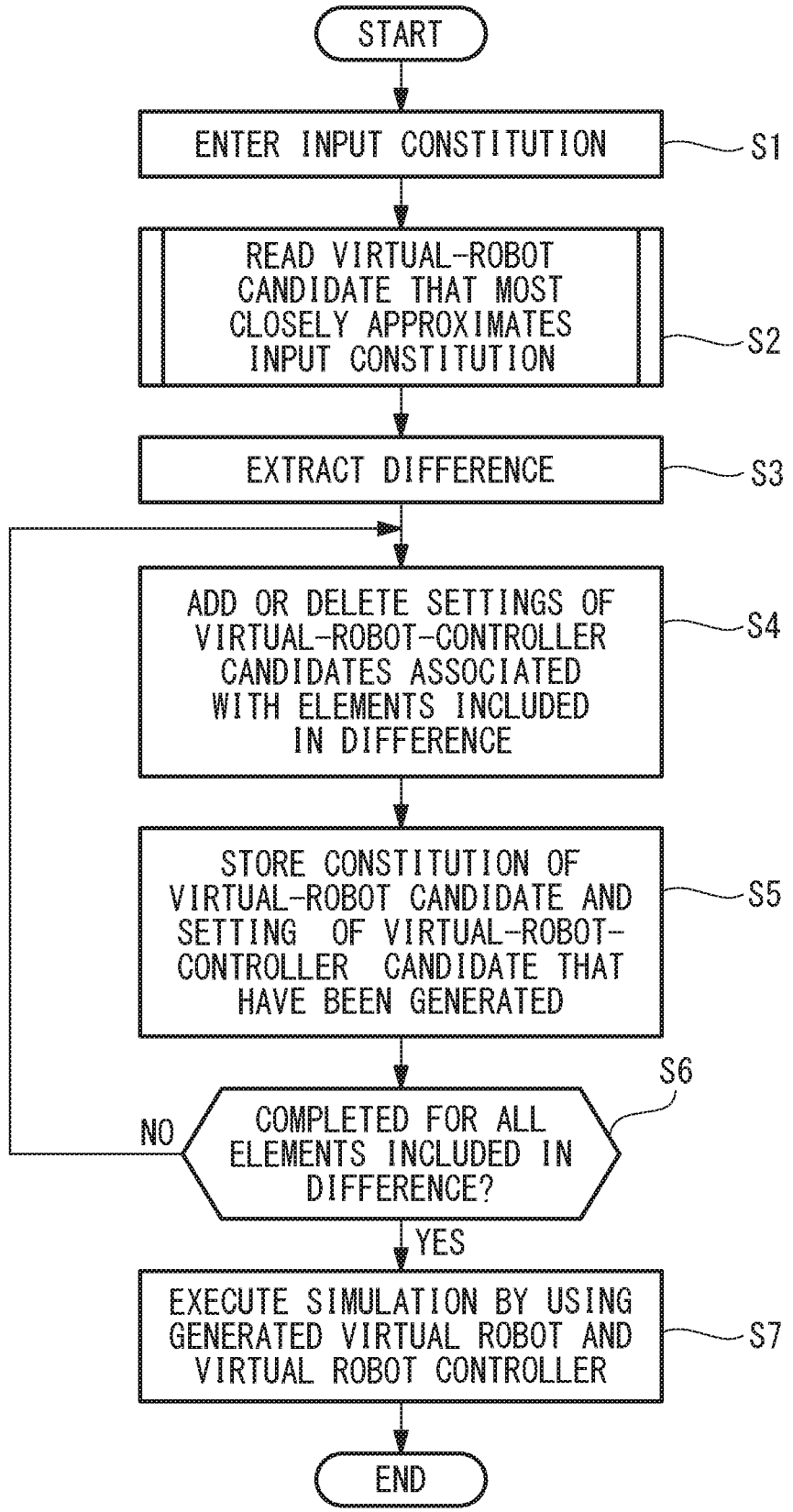
FIG. 3 is a flowchart for explaining a simulation method employing the simulation device in FIG. 1.

As shown in FIG. 3, the simulation method for a robot system according to this embodiment is started when an operator inputs the constitution of a virtual robot to be simulated (input constitution) via the input unit 2 (input step S1).

Figure 4:
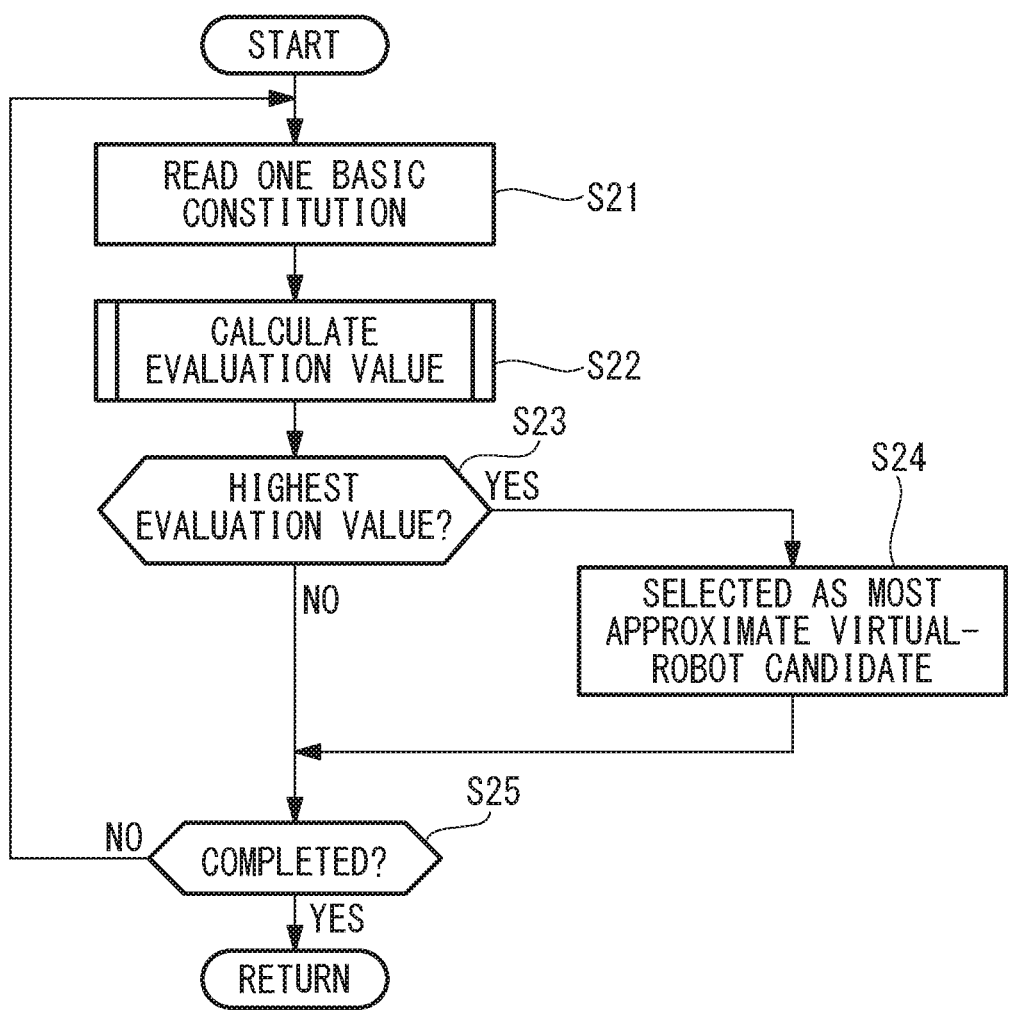
FIG. 4 is a flowchart for explaining a process of determining a most approximate virtual-robot candidate in the flowchart in FIG. 3.

Upon the input of the input constitution, the difference extracting unit 4 reads a virtual-robot candidate that most closely approximates the input constitution from the storage unit 3 (step S2). In order to read the most approximate virtual-robot candidate, as shown in FIG. 4, one of the virtual-robot candidates (basic constitutions) stored in the storage unit 3 is read (step S21), and an evaluation value therefor is calculated (step S22).

Figure 5:
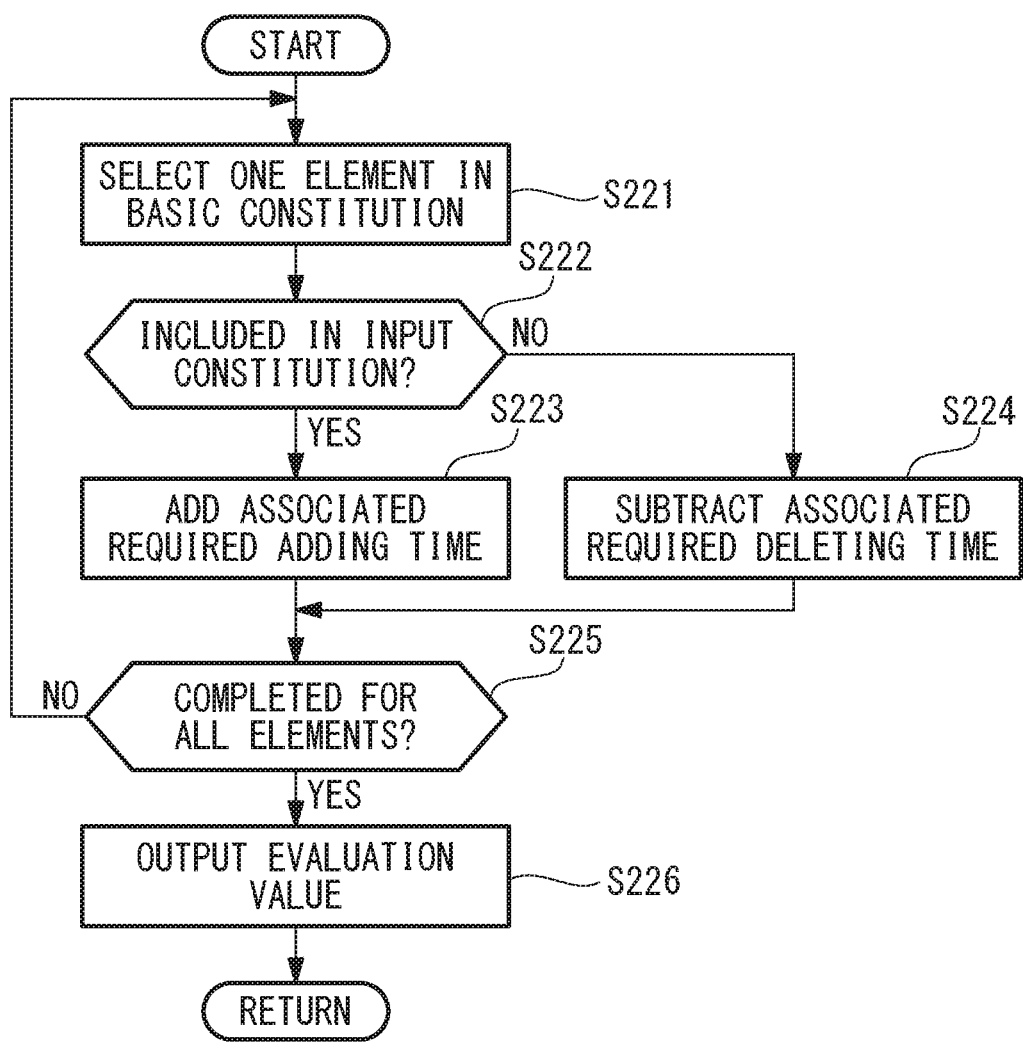
FIG. 5 is a flowchart for explaining a process of calculating an evaluation value in FIG. 4.

In order to calculate the evaluation value, as shown in FIG. 5, one of the elements in the basic constitution is selected (step S221), and it is determined whether the selected element is included in the input constitution (step S222). In the case where the selected element is included, the evaluation value is calculated by adding the required adding time stored in association with that element (step S223). In the case where the selected element is not included, the evaluation value is calculated by subtracting the required deleting time stored in association with that element (step S224).

Then, it is determined whether or not the processing for calculating the evaluation value by using all of the elements in the basic constitution has been completed (step S225). In the case where the processing has been completed, the evaluation value is output (step S226). In the case where the processing has not been completed, the processing from step S221 is repeated.

Then, it is determined whether or not the evaluation value calculated in the manner described above is the highest among the evaluations values for the virtual-robot candidates that have been read so far (step S23). In the case where the evaluation value is the highest, the virtual-robot candidate is selected as the most approximate virtual-robot candidate (step S24). In the case where the evaluation value is not the highest, it is determined whether or not any other virtual-robot candidate is remaining (step S25).

In the case where any other virtual-robot candidate is remaining, the processing from step S21 is repeated. In the case where no other virtual-robot candidate is remaining, the virtual-robot candidate that is selected finally is read from the storage unit 3 as the most approximate virtual-robot candidate.

Then, the difference between the input constitution and the virtual-robot candidate that most closely approximates the input constitution is extracted (difference extracting step S3). Then, the settings of the virtual-robot controller candidates associated with the individual elements included in the extracted difference are added to or deleted from the setting of the virtual-robot-controller candidate stored in association with the virtual-robot candidate (virtual-robot generating step S4).

Each time the constitution of a new virtual-robot candidate is generated by adding or deleting an individual element and the setting of a virtual-robot-controller candidate is generated, the constitution and the setting are stored in the storage unit 3 in association with each other (candidate updating step S5).

Then, it is determined whether or not the addition or deletion for all the elements in the extracted difference has been completed (step S6). In the case where the addition or deletion has not been completed, the processing from step S4 is repeated. In the case where the addition or deletion has been completed, since the virtual-robot candidate and the virtual-robot-controller candidate that are generated finally serve as the constitution of a virtual robot corresponding to the input constitution and the setting of a virtual-robot controller associated therewith, simulation for the robot system is executed by using the virtual robot and the virtual-robot controller (step S7).

As described above, with the simulation device 1 and the simulation method for a robot system according to this embodiment, in the process of generating the constitution of a virtual robot to be simulated and the setting of a virtual-robot controller associated therewith, the constitution of a virtual-robot candidate generated by adding or deleting an individual element and the setting of a virtual-robot-controller candidate associated therewith are also stored in the storage unit 3. This increases the likelihood that a more approximate virtual-robot candidate can be selected when generating a new virtual robot the next time. Accordingly, an advantage is afforded in that the time for setting a virtual-robot controller to be simulated can be reduced.

In this embodiment, each time the constitution of a new virtual-robot candidate and the setting of a virtual-robot-controller candidate associated therewith are generated, the constitution and the setting are stored in the storage unit 3. Alternatively, the storage frequency may be once every certain number of times. Furthermore, the storage frequency may be changed depending on the required speed for storage into the storage unit 3 or the amount of information to be stored in the storage unit 3.

The number of settings of virtual-robot-controller candidates that are stored at one go is increased in the case where the required speed for storage into the storage unit 3 is slow, whereas the number is decreased in the case where the required speed is fast, which makes it possible to prevent fluctuations in the required speed for storage. Considering that storage takes more time as the amount of information increases, the number of settings of virtual-robot-controller candidates that are stored at one go may be increased or decreased depending on the amount of information, which also makes it possible to prevent fluctuations in the required speed for storage.

A usage-frequency counting unit (not shown) that increments the usage frequency each time a virtual-robot candidate that most closely approximates the input constitution is selected and a storage-capacity detecting unit (not shown) that detects the remaining capacity of the storage unit 3 may be provided.

The usage frequency counted by the usage-frequency counting unit may be stored in association with virtual-robot candidates, and in the case where the remaining capacity of the storage unit 3 as detected by the storage-capacity detecting unit has become less than a predetermined threshold, unneeded virtual-robot candidates and the settings of the virtual-robot-controller candidates associated therewith may be deleted from the storage unit 3. This deletion may be performed by repeating preferential deletion of a virtual-robot candidate that approximates a frequently used virtual-robot candidate until the remaining capacity becomes sufficient.

That is, a virtual-robot candidate that approximates a frequently used virtual-robot candidate can be set in a short time from the frequently used virtual-robot candidate, and thus there is only a small benefit in storing the virtual-robot candidate in addition to the frequently used virtual robot candidate. Thus, by preferentially deleting such virtual-robot candidates, it is possible to increase the remaining capacity of the storage unit 3, which makes it possible to store virtual-robot candidates with greater needs and the settings of the virtual-robot-controller candidates associated therewith.

Whether or not a virtual-robot candidate approximates a frequently used virtual robot candidate can be determined on the basis of the same evaluation value used for selecting a virtual-robot candidate that most closely approximates the input constitution.

In the embodiment described above, the evaluation value is calculated by adding up the required adding time for each element included in the input constitution and subtracting the required deleting time for each element not included in the input constitution. Alternatively, a virtual-robot candidate with the least total required time obtained by adding up all the required adding times for elements to be added and the required deleting times for elements to be deleted in order to generate the input constitution may be selected as the most approximate virtual-robot candidate.

Although the above embodiment has been described in the context of an example where basic constitutions each constituted of a combination of a plurality of elements are stored in the storage unit 3, in the case where basic constitutions are not stored in the storage unit 3, a new virtual-robot candidate may be generated by combining individual elements.

Among individual elements, for elements that cannot be deleted, such as software options, infinite values may be stored as the required deleting times.

As a result, the following aspect is derived from the above described embodiment.

The present invention, in one aspect thereof, provides a simulation device for a robot system, the simulation device including an input unit that allows input of the constitution of a virtual robot to be simulated; a storage unit that stores the constitutions as well as elements of virtual-robot candidates and settings of virtual-robot-controller candidates in association with each other; a difference extracting unit that reads, from the storage unit, the constitution of one of the virtual-robot candidates that most closely approximates the constitution of the virtual robot input via the input unit and that extracts the difference between the read constitution of the virtual-robot candidate and the constitution of the virtual robot input via the input unit; a virtual-robot generating unit that reads, from the storage unit, the setting of the virtual-robot-controller candidate associated with the constitution of the most approximate virtual-robot candidate and the settings of the virtual-robot-controller candidates associated with the elements of the virtual-robot candidates included in the difference extracted by the difference extracting unit and that adds or deletes the setting of the associated virtual-robot-controller candidate for each of the elements of the virtual-robot candidates included in the difference to or from the setting of the most approximate virtual-robot-controller candidate to generate the constitutions of new virtual-robot candidates and settings of virtual-robot-controller candidates associated therewith and the constitution of a new virtual robot and a setting of a virtual robot controller associated therewith; and a candidate updating unit that stores, in the storage unit, the constitutions of the new virtual-robot candidates and the settings of the virtual-robot-controller candidates associated therewith, generated by the virtual-robot generating unit.

According to this aspect, when the constitution of a virtual robot to be simulated is input via the input unit, the constitution of a virtual-robot candidate that most closely approximates the input constitution of the virtual robot among the constitutions of the virtual-robot candidates stored in the storage unit is read. Then, the difference extracting unit extracts the difference between the read constitution of the virtual-robot candidate and the input constitution of the virtual robot. It is possible to obtain a setting of a desired virtual robot controller by adding or deleting the settings associated with the elements included in the extracted difference to or from the setting of the virtual-robot-controller candidate associated with the most approximate virtual-robot candidate.

In this case, for each of the elements included in the difference extracted by the difference extracting unit, the virtual-robot generating unit adds or deletes the setting associated with that element to or from the read setting of the virtual-robot-controller candidate, thereby generating a virtual-robot candidate and a setting of a virtual-robot-controller candidate associated therewith, and the candidate updating unit updates the information stored in the storage unit.

That is, in the case where the constitution of the virtual robot to be simulated differs from the constitution of the most approximate virtual-robot candidate stored in the storage unit, elements to be added or deleted to or from the virtual-robot candidate in order to generate the input constitution are identified, and the identified elements are added or deleted, on a per-element basis, to or from the setting of the virtual-robot-controller candidate associated with the read virtual-robot candidate, thereby generating the constitution of a new virtual-robot candidate and a setting of a virtual-robot-controller candidate, which are stored in the storage unit.

Accordingly, in the case where a plurality of elements are included in the difference, it is possible to store, in the storage unit, a corresponding number of constitutions of new virtual-robot candidates and settings of virtual-robot-controller candidates associated therewith. Thus, it is possible to increase the likelihood that a virtual-robot candidate with less difference is read in the case where simulation is newly performed for a virtual robot in a later occasion. This serves to reduce the time needed for generating a virtual robot controller to be simulated.

In the above aspect, the storage unit may store, for each of the elements of the virtual-robot candidates, a required time for adding or deleting a setting associated with that element, and the difference extracting unit may read, from the storage unit, as the most approximate virtual-robot candidate, a virtual-robot candidate with the least total required time for obtaining the setting of the virtual robot controller associated with the constitution of the virtual robot input via the input unit.

Accordingly, in the case where a virtual robot to be simulated is generated on the basis of the virtual-robot candidates stored in the storage unit, it is possible to generate a setting of a virtual robot controller associated therewith with the least time.

In the above aspect, the difference extracting unit, for each of the elements of the virtual-robot candidates stored in the storage unit, may add the required time for adding the element, stored in the storage unit in association with the element, in the case where the element is included in the virtual robot input via the input unit, may subtract the required time for deleting the element, stored in the storage unit in association with the element, in the case where the element is not included in the virtual robot input via the input unit, and may read the virtual robot candidate with the greatest value of the computation result as the most approximate virtual robot candidate.

Accordingly, it is possible to utilize the computation results as temporal distances for generating the virtual robot to be simulated from the virtual-robot candidates stored in the storage unit. By using the virtual-robot candidate with the greatest value of the computation result as the most approximate virtual-robot candidate, it is possible to generate a setting of a virtual robot controller associated therewith with the least time.

In the above aspect, the difference extracting unit may add up the required times stored in the storage unit in association with the individual elements included in the difference when adding or deleting the settings associated with those elements and may use the virtual robot candidate with the least value of the computation result as the most approximate virtual robot candidate.

Accordingly, it is possible to utilize the computation results as the required times for adding or deleting all the settings associated with the elements included in the difference. By using the virtual-robot candidate with the least value of the computation result as the most approximate virtual-robot candidate, it is possible to generate a setting of a virtual robot controller associated therewith with the least time.

In the above aspect, the simulation device may further include a usage-frequency counting unit that increments the usage frequency of a virtual-robot candidate each time the virtual-robot candidate is read by the difference extracting unit as the most approximate virtual-robot candidate; and a storage-capacity detecting unit that detects the remaining capacity of the storage unit, the candidate updating unit may delete, from the storage unit, the constitution of a virtual robot candidate that approximates a virtual-robot candidate with the greatest usage frequency, as well as the setting of the virtual-robot-controller candidate associated therewith, in the case where the remaining capacity detected by the storage-capacity detecting unit is less than a predetermined threshold.

Accordingly, since it is possible to generate the virtual robot that approximates the virtual-robot candidate with the greatest usage frequency from the virtual-robot candidate with the greatest usage frequency, there is no need to store both. By deleting the approximate virtual robot, it is possible to efficiently increase the remaining capacity of the storage unit.

In the above aspect, each time the virtual-robot generating unit generates the constitution of a new virtual-robot candidate and a setting of a virtual-robot-controller candidate associated therewith, the candidate updating unit may store the constitution and the setting in the storage unit.

Accordingly, the candidate updating unit can sequentially store, in the storage unit, the settings of the virtual-robot-controller candidates generated by the virtual-robot generating unit during the process of generating a new virtual robot controller to be simulated.

In the above aspect, each time the virtual-robot generating unit generates settings of virtual-robot-controller candidates associated with the constitutions of a predetermined number of new virtual-robot candidates, the candidate updating unit may store the constitutions and the settings in the storage unit.

Accordingly, settings are stored in the storage unit each time the virtual-robot generating unit generates the predetermined number of settings of virtual-robot-controller candidates during the process of generating a new virtual robot controller to be simulated, which serves to save the time needed for storage.

In the above aspect, the candidate updating unit may change the predetermined number in accordance with a required speed of storage into the storage unit or the amount of information to be stored in the storage unit.

Accordingly, the number of settings of virtual-robot-controller candidates that are stored at one go is increased in the case where the required speed for storage into the storage unit is slow, whereas the number is decreased in the case where the required speed is fast, which makes it possible to prevent fluctuations in the required speed for storage. Considering that storage takes more time as the amount of information increases, the number of settings of virtual-robot-controller candidates that are stored at one go may be increased or decreased depending on the amount of information, which also makes it possible to prevent fluctuations in the speed required for storage.

The present invention, in another aspect thereof, provides a simulation method for a robot system, the simulation method including an input step of allowing input of the constitution of a virtual robot to be simulated; a difference extracting step of reading, from a storage unit, the constitution of one of the virtual-robot candidates that most closely approximates the constitution of the virtual robot input in the input step and extracting the difference between the read constitution of the virtual-robot candidate and the constitution of the virtual robot input in the input step; a virtual-robot generating step of reading, from the storage unit, the setting of the virtual-robot-controller candidate associated with the constitution of the most approximate virtual-robot candidate and the settings of the virtual-robot-controller candidates associated with elements of the virtual-robot candidates included in the difference extracted in the difference extracting step and adding or deleting the setting of the associated virtual-robot-controller candidate for each of the elements of the virtual-robot candidates included in the difference to or from the setting of the most approximate virtual-robot-controller candidate to generate the constitutions of new virtual-robot candidates and settings of virtual-robot-controller candidates associated therewith and the constitution of a new virtual robot and a setting of a virtual robot controller associated therewith; and a candidate updating step of storing, in the storage unit, the constitutions of the new virtual-robot candidates and the settings of the virtual-robot-controller candidates associated therewith, generated in the virtual-robot generating step.

In the above aspect, the storage unit may store, for each of the elements of the virtual-robot candidates, a required time for adding or deleting a setting associated with that element, and in the difference extracting step, as the most approximate virtual-robot candidate, a virtual-robot candidate with the least total required time for obtaining the setting of the virtual robot controller associated with the constitution of the virtual robot input in the input step may be read from the storage unit.

The invention claimed is:

1. A simulation device for a robot system, the simulation device comprising:
    an input unit that allows input of the constitution of a virtual robot to be simulated;
    a storage unit that stores the constitutions and elements of virtual-robot candidates and settings of virtual-robot-controller candidates in association with each other;
    a difference extracting unit that reads, from the storage unit, the constitution of one of the virtual-robot candidates that most closely approximates the constitution of the virtual robot input via the input unit and that extracts the difference between the read constitution of the virtual-robot candidate and the constitution of the virtual robot input via the input unit;
    a virtual-robot generating unit that reads, from the storage unit, the setting of the virtual-robot-controller candidate associated with the constitution of the most approximate virtual-robot candidate and the settings of the virtual-robot-controller candidates associated with the elements of the virtual-robot candidates included in the difference extracted by the difference extracting unit and that adds or deletes the setting of the associated virtual-robot-controller candidate for each of the elements of the virtual-robot candidates included in the difference to or from the setting of the most approximate virtual-robot-controller candidate to generate the constitutions of new virtual-robot candidates and settings of virtual-robot-controller candidates associated therewith and the constitution of a new virtual robot and a setting of a virtual robot controller associated therewith; and
    a candidate updating unit that stores, in the storage unit, the constitutions of the new virtual-robot candidates and the settings of the virtual-robot-controller candidates associated therewith, generated by the virtual-robot generating unit.

2. A simulation device for a robot system according to claim 1,
    wherein the storage unit stores, for each of the elements of the virtual-robot candidates, a required time for adding or deleting a setting associated with that element, and
    wherein the difference extracting unit reads, from the storage unit, as the most approximate virtual-robot candidate, a virtual-robot candidate with the least total required time for obtaining the setting of the virtual robot controller associated with the constitution of the virtual robot input via the input unit.

3. A simulation device for a robot system according to claim 2, wherein the difference extracting unit, for each of the elements of the virtual-robot candidates stored in the storage unit, adds the required time for adding the element, stored in the storage unit in association with the element, in the case where the element is included in the virtual robot input via the input unit, subtracts the required time for deleting the element, stored in the storage unit in association with the element, in the case where the element is not included in the virtual robot input via the input unit, and reads the virtual robot candidate with the greatest value of the computation result as the most approximate virtual robot candidate.

4. A simulation device for a robot system according to claim 2, wherein the difference extracting unit adds up the required times stored in the storage unit in association with the individual elements included in the difference when adding or deleting the settings associated with those elements and uses the virtual robot candidate with the least value of the computation result as the most approximate virtual robot candidate.

5. A simulation device for a robot system according to claim 1, further comprising:
    a usage-frequency counting unit that increments the usage frequency of a virtual-robot candidate each time the virtual-robot candidate is read by the difference extracting unit as the most approximate virtual-robot candidate; and
    a storage-capacity detecting unit that detects the remaining capacity of the storage unit,
    wherein the candidate updating unit deletes, from the storage unit, the constitution of a virtual robot candidate that approximates a virtual-robot candidate with the greatest usage frequency, as well as the setting of the virtual-robot-controller candidate associated therewith, in the case where the remaining capacity detected by the storage-capacity detecting unit is less than a predetermined threshold.

6. A simulation device for a robot system according to claim 1, wherein, each time the virtual-robot generating unit generates the constitution of a new virtual-robot candidate and a setting of a virtual-robot-controller candidate associated therewith, the candidate updating unit stores the constitution and the setting in the storage unit.

7. A simulation device for a robot system according to claim 1, wherein, each time the virtual-robot generating unit generates settings of virtual-robot-controller candidates associated with the constitutions of a predetermined number of new virtual-robot candidates, the candidate updating unit stores the constitutions and the settings in the storage unit.

8. A simulation device for a robot system according to claim 7, wherein the candidate updating unit changes the predetermined number in accordance with a required speed of storage into the storage unit or the amount of information to be stored in the storage unit.

9. A simulation method for a robot system, the simulation method comprising:
an input step of allowing input of the constitution of a virtual robot to be simulated;
a difference extracting step of reading, from a storage unit, the constitution of one of the virtual-robot candidates that most closely approximates the constitution of the virtual robot input in the input step and extracting the difference between the read constitution of the virtual-robot candidate and the constitution of the virtual robot input in the input step;
a virtual-robot generating step of reading, from the storage unit, the setting of the virtual-robot-controller candidate associated with the constitution of the most approximate virtual-robot candidate and the settings of the virtual-robot-controller candidates associated with elements of the virtual-robot candidates included in the difference extracted in the difference extracting step and adding or deleting the setting of the associated virtual-robot-controller candidate for each of the elements of the virtual-robot candidates included in the difference to or from the setting of the most approximate virtual-robot-controller candidate to generate the constitutions of new virtual-robot candidates and settings of virtual-robot-controller candidates associated therewith and the constitution of a new virtual robot and a setting of a virtual robot controller associated therewith; and
a candidate updating step of storing, in the storage unit, the constitutions of the new virtual-robot candidates and the settings of the virtual-robot-controller candidates associated therewith, generated in the virtual-robot generating step.

10. A simulation method for a robot system according to claim 9,
wherein the storage unit stores, for each of the elements of the virtual-robot candidates, a required time for adding or deleting a setting associated with that element, and
wherein, in the difference extracting step, as the most approximate virtual-robot candidate, a virtual-robot candidate with the least total required time for obtaining the setting of the virtual robot controller associated with the constitution of the virtual robot input in the input step is read from the storage unit.

* * * * *